(12) United States Patent
Smeeton et al.

(10) Patent No.: US 12,736,640 B2
(45) Date of Patent: Sep. 15, 2026

(54) LIGHT DETECTION AND RANGING

(71) Applicant: Dualitas Ltd, Milton Keynes (GB)

(72) Inventors: Timothy Smeeton, Milton Keynes (GB); Konstantinos Papadimitriou, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 759 days.

(21) Appl. No.: 18/005,459

(22) PCT Filed: Jul. 6, 2021

(86) PCT No.: PCT/EP2021/068607
§ 371 (c)(1),
(2) Date: Jan. 13, 2023

(87) PCT Pub. No.: WO2022/028797
PCT Pub. Date: Feb. 10, 2022

(65) Prior Publication Data

US 2023/0266447 A1 Aug. 24, 2023

(30) Foreign Application Priority Data

Aug. 5, 2020 (GB) ..................................... 2012166

(51) Int. Cl.

| | |
|---|---|
| ***G01S 7/487*** | (2006.01) |
| ***G01S 7/481*** | (2006.01) |
| ***G03H 1/00*** | (2006.01) |
| ***G03H 1/22*** | (2006.01) |

(52) U.S. Cl.
CPC ............ *G01S 7/487* (2013.01); *G01S 7/4816* (2013.01); *G03H 1/0005* (2013.01);
(Continued)

(58) Field of Classification Search
CPC ...... G01S 7/487; G01S 7/4816; G01S 17/894; G01S 7/4876; G03H 1/0005;
(Continued)

(56) References Cited

U.S. PATENT DOCUMENTS

| | | | | |
|---|---|---|---|---|
| 11,698,441 B2 * | 7/2023 | Rowlands | ............. | G01S 7/4817 356/4.01 |
| 2013/0050710 A1 * | 2/2013 | Yamaguchi | ............. | G06F 3/011 356/610 |

(Continued)

FOREIGN PATENT DOCUMENTS

| | | | |
|---|---|---|---|
| EP | 3165815 A1 * | 5/2017 | ........... G01S 17/931 |
| GB | 2574058 A | 11/2019 | |

OTHER PUBLICATIONS

Combined Search and Examiner Report for GB2012166.1, Dated May 12, 2021.

(Continued)

*Primary Examiner* — Assres H Woldemaryam
(74) *Attorney, Agent, or Firm* — McDonnell Boehnen Hulbert & Berghoff LLP

(57) ABSTRACT

A LIDAR system comprises a spatial light modulator for displaying a diffractive pattern comprising a hologram of a structured light pattern that is projected onto a scene. The structured light pattern comprises an array of light spots and a light source for illuminating the diffractive pattern to form a holographic reconstruction of the light pattern. A detection subsystem comprises light detection elements that detect light from a respective individual field of view (FOV) of the scene and output a respective detected light signal. A first subset of the individual FOVs are illuminated by a light spot of the light pattern and a second subset are not illuminated by the light spot. The system comprises a processor for identifying noise in a first detected light signal, relating to an individual FOV of the first subset, using a second detected light signal, relating to an individual FOV of the second subset.

19 Claims, 8 Drawing Sheets

(52) U.S. Cl.
CPC ......... *G03H 1/2202* (2013.01); *G03H 1/2294* (2013.01); *G03H 2001/0033* (2013.01); *G03H 2226/11* (2013.01)

(58) Field of Classification Search
CPC ............... G03H 1/2202; G03H 1/2294; G03H 2001/0033; G03H 2226/11; G03H 2001/2247; G03H 2001/2297; G03H 2222/36; G03H 1/08
See application file for complete search history.

(56) References Cited

U.S. PATENT DOCUMENTS

| | | | | |
|---|---|---|---|---|
| 2015/0009695 | A1* | 1/2015 | Christmas | F21S 41/14 362/466 |
| 2017/0343653 | A1* | 11/2017 | Weinberg | G01S 17/10 |
| 2018/0046138 | A1* | 2/2018 | Christmas | F21S 41/25 |
| 2018/0095165 | A1* | 4/2018 | Cohen | G01S 7/484 |
| 2019/0041797 | A1* | 2/2019 | Christmas | G03H 1/2294 |
| 2019/0354069 | A1* | 11/2019 | Christmas | G03H 1/2202 |
| 2020/0124726 | A1* | 4/2020 | Geuens | G01S 7/4863 |
| 2020/0249354 | A1* | 8/2020 | Yeruhami | G01S 7/4815 |
| 2020/0292990 | A1* | 9/2020 | Christmas | G03H 1/2286 |
| 2021/0055691 | A1* | 2/2021 | Wengierow | G02B 27/0172 |
| 2021/0072379 | A1* | 3/2021 | Christmas | G01S 7/4863 |
| 2021/0084270 | A1* | 3/2021 | Christmas | G03H 1/30 |
| 2021/0088970 | A1* | 3/2021 | Wengierow | G03H 1/2294 |

OTHER PUBLICATIONS

Search Report and Written Opinion for PCT/EP2021/068607, Dated Oct. 18, 2021.

* cited by examiner

LIGHT DETECTION AND RANGING

RELATED APPLICATIONS

This application claims the benefit under 35 U.S.C. § 371 of the filing date of International Patent Application No. PCT/EP2021/068607, having an international filing date of Jul. 6, 2021, which claims priority to United Kingdom Application No. 2012166.1, filed Aug. 5, 2020, the contents of both of which are incorporated herein by reference in their entirety.

FIELD

The present disclosure relates to making observations of a scene. More specifically, the present disclosure relates to a light detection and ranging, "LIDAR", system arranged to make time of flight measurements of a scene and to a method of identifying, and optionally to reducing, noise in a detected light signal from a detector that is comprised within such a light detection and ranging, "LIDAR", system. Some embodiments relate to an automotive LIDAR system or to a LIDAR system comprised within a portable device.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example. The holographic projector may be used for light detection and ranging (LIDAR). Light detection and ranging (LIDAR) systems may be used in a variety of applications including portable devices and vehicles.

The present disclosure is concerned with improvements in holographic systems such as light detection and ranging (LIDAR) systems. In particular, such improvements may include more reliable and/or more accurate techniques for surveying an area, or scene, in order to detect features of interest, using light detection and ranging. Such improvements may include the detection, and may include the reduction, of noise in one or more light detection signals that are emitted by a detector, within a LIDAR system. The noise may comprise background light in or around a scene, and/or may comprise structured light from another LIDAR system.

SUMMARY

Aspects of the present disclosure are defined in the appended independent claims. In general terms; a system is provided, comprising a holographic projector and a corresponding light detector, wherein the holographic projector is arranged to direct structured (i.e. holographic) light towards an object or scene and the light detector is arranged to detect reflected light from the object or scene. The system may be a light detection and ranging, "LIDAR" system.

The system is arranged to use detected light signals from a region or regions of a scene, which are not illuminated by the structured (i.e. holographic) light, at a given time, in order to identify noise or interference in one or more detected light signals from a region or regions of the scene, which are illuminated by the structured (i.e. holographic) light, at that time. It may be determined that a detected light signal from the region(s) that is/are currently not illuminated represents noise, as far as the LIDAR system is concerned, and an assessment may be made as to whether that noise, or part of that noise or a similar noise, is also present in the region(s) that is/are currently being illuminated by the LIDAR system. This may enable the LIDAR system to only use the components of the detected light signal for the illuminated region(s) that are a true representation of the structured (i.e. holographic) light being reflected from the scene, at that time, when making observations about the scene and/or when forming one or more images of the scene.

The system (and corresponding method) therefore harnesses the particular properties of the LIDAR system, to provide noise identification using detected light signals, such as substantially concurrently-detected light signals, on a dynamic basis, thus leading to enhanced performance of the system for interrogating a scene. The present inventors have recognised the usefulness of the one-to-one correspondence between the light detection elements of the detection system and the individual fields of view (IFOV) of the scene, for noise identification. Moreover, they have recognised that the LIDAR system "knows" the form of the structured light pattern that it projects, and thus knows which IFOV's respectively will, and will not, be illuminated by it, at any given time. It also knows the spatial relationships between individual illuminated and non-illuminated IFOV's. The processor is therefore specifically arranged to look at the respective light signals relating to one IFOV that is illuminated, and one IFOV that is not illuminated, for example during a common time window when the structured light pattern is projected onto the scene. The processor can then use those signals to quickly identify noise, which is distinct from the light that would be expected to result from the structured light pattern being projected onto, and reflected from, the scene.

There may be a correspondence, such as a positional correspondence, between the two regions, whose respective detected light signals are used. For example, the two regions may be adjacent regions or may be neighbouring regions. There may be a temporal correspondence between the two detected light signals. For example, they may be output by the detector substantially simultaneously or they may both be output within a common pre-determined time window. The two detected light signals may be described as being "concurrent" with one another. In some cases, the two detected light signals may correspond to the same region, but at different respective times, wherein the illumination status (i.e. whether or how the region is illuminated by the structured light) of the region changes between those different respective times. The regions may be referred to as 'individual fields of view' or as discrete 'light receiving areas'. Each region may trigger detected light signals at a corresponding (i.e. respective) one light detecting element. In another example, each region may trigger detected light signals at a corresponding (i.e. respective) one group (or, one plurality) of light detecting elements, within the light detector.

According to an aspect, a light detection and ranging, "LIDAR" system is provided comprising a spatial light modulator (SLM) arranged to display a diffractive pattern comprising a hologram of a structured light pattern, wherein the structured light pattern comprises an array of light spots, and a light source arranged to illuminate the diffractive pattern in order to form a holographic reconstruction of the structured light pattern. The structured light pattern is projected onto the scene. The holographic reconstruction may be directly or indirectly projected onto the scene. The LIDAR system further comprises a detection system comprising a plurality of light detection elements, each arranged to detect light from a respective individual field of view of the scene and to output a respective detected light signal, wherein a first subset of the individual fields of view are illuminated by a light spot of the structured light pattern and a second subset of the individual fields of view are not illuminated by a light spot of the structured light pattern. The LIDAR system further comprises a processor arranged to identify noise in a first detected light signal, relating to an individual field of view of the first subset, using a second detected light signal, relating to an individual field of view of the second subset.

The first detected light signal may relate to the individual field of view of the first subset, during a time window within which the structured light pattern is projected onto the scene. The second detected light signal may relate to the individual field of view of the second subset during that same time window. Thus, noise in a first light signal, relating to an illuminated area, can be identified using a second, substantially concurrent light signal, relating to a non-illuminated area. In this context, "illuminated" and "non-illuminated" may be understood to mean "directly illuminated by the structured light pattern" and "not directly illuminated by the structured light pattern", respectively.

The (illuminated) individual field of view (IFOV) of the first subset and the (non-illuminated) individual field of view (IFOV) of the second subset may be selected, by the processor or by another aspect of the LIDAR system, using one or more criteria, in order to identify noise in the first detected light signal using the second detected light signal. For example, they may be selected based on their spatial relationship with one another and/or based on a position of one or both of them, within the structured light pattern and/or within the scene that is to be interrogated.

Each of the detected light signals may comprise one or more components (or pulses, or sub-signals) or one or more group of components (or group of pulses, or group of sub-signals). Each detected light signal may comprise a signal shape and/or a signal pattern and/or one or more intensities. Each of the detected light signals may be represented in any suitable manner. For example, they may be represented by one or more histograms, showing detected light intensity (or number of photons or simply whether or not a photon was detected at a particular time or within a particular time interval) as a function of time, for one or more light detecting elements. Each of the detected light signals may be used to form a point cloud representation of the scene, or of an area within the scene, or of an object or feature comprised within, or related to, the scene.

The processor may be arranged to compare the first and second detected signals, in part or in full, to one another. Either the first detected signal and/or the second detected signal may be compared to one or more other detected signals as well.

The processor may be arranged to identify noise in detected light signals relating to a first respective plurality of individual fields of view, within the first subset of the individual fields of view that are illuminated by a light spot of the structured light pattern, using one or more detected light signals relating to a second respective plurality of individual fields of view, within the second subset of the individual fields of view, which are not illuminated by a light spot of the structured light pattern. The processor may be arranged to select multiple different pairs or groups of individual fields of view, wherein each pair or group comprises at least one illuminated individual field of view and at least one non-illuminated individual field of view, and to use the corresponding detected light signals to identify noise in one or more of the illuminated individual fields of view within the pair or group.

The processor may be arranged to identify noise in a first detected light signal, relating to an individual field of view of the first subset, multiple times, for example on a cyclical or repeated basis. The composition of the first subset (i.e. the identities of one or more of the individual fields of view that are comprised within the first subset) may change, over time.

The processor may be arranged to determine that one or more components of the second detected light signal, which relates to an individual field of view that the LIDAR system is not illuminating—i.e. which relates to a dark region of the holographic reconstruction of the structured light pattern—comprises noise, or interference. For example, it may comprise unstructured natural or artificial 'background' light and/or it may comprise light from a source other than the present LIDAR system. The processor may be arranged to determine whether that noise (or part of that noise or a substantially similar noise) is also present in the first detected light signal, which relates to an individual field of view that the LIDAR system is illuminating—i.e. which relates to a light spot of the holographic reconstruction of the structured light pattern.

The processor may be further arranged to reduce the noise in the first detected light signal, or in a signal derived from the first detected light signal, as a result of said identification of noise in the first detected light signal. For example, it may be arranged to subtract a noise signal (or a noise component, or a part of a noise signal or noise component) from the first detected light signal, to produce a resultant or 'net' detected light signal for the individual field of view of the first subset, to which the first detected light signal relates. In some embodiments, the processor simply deducts the second detected light signal from its corresponding first detected light signal. The net detected light signal may be used to make observations about the scene (or at least, observations about the part of the scene corresponding to the individual field of view) and in some cases to help form an image, such as a three-dimensional image (or point cloud representation), of the scene. For example, the processor may be arranged to ignore or to amend or to recreate a point cloud representation of the scene, or of a feature or object within or relating to the scene, as a result of using the second detected light signal to identify noise in the first detected light signal.

The individual field of view of the first subset, to which the first detected light signal relates, may have a predetermined spatial relationship with the individual field of view of the second subset, to which the second detected light signal relates. It may be said that the two individual fields of view have a correspondence to one another. For example, it may be a positional correspondence. For example, they may be adjacent one another or neighbouring one another, or they may be located within a predetermined distance from one another, or in a predetermined direction from one another. One or more individual fields of view may be specifically selected from each of the first and second subsets, based on their spatial relationship(s), for use in signal comparison and noise identification.

The processor may be arranged to use the second detected light signal to identify noise in the first detected light signal if there is a predetermined temporal relationship between a time at which a light detection element of the detector outputs the first detected light signal and a time at which a light detection element of the detector outputs the second detected light signal. For example, the first detected light signal and the second detected light signal may be output substantially simultaneously, or at least within a predetermined common time window. For example, there may be a time gap between the output of the first detected light signal and output of the second detected light signal, wherein that time gap may not exceed a predetermined threshold, if the second detected light signal is to be used for identifying noise in the first detected light signal.

The processor may be arranged to use the second detected light signal to identify noise in a first detected light signal if there is a match between the first detected signal and the second detected signal, at least to within a predetermined degree of tolerance, with respect to any of: signal intensity; signal duration; signal shape; or signal pattern.

The SLM may be arranged to dynamically change its displayed diffractive pattern in order to change which individual fields of view are comprised within the first subset, and so are illuminated by a light spot of the structured light pattern, and which individual fields of view are comprised within the second subset, and so are not illuminated by a light spot of the structured light pattern. For example, the SLM may be arranged to change the hologram it displays and/or to add or change a software grating, to change the position of the holographic reconstruction on its holographic replay plane (and, therefore, on the scene.)

According to an aspect, a method is provided of light detection and ranging "LIDAR", the method comprising displaying a diffractive pattern comprising a hologram of a structured light pattern, wherein the structured light pattern comprises an array of light spots and illuminating the diffractive pattern in order to form a holographic reconstruction of the structured light pattern, and to project the structured light pattern onto a scene. The method further comprises detecting light from each individual field of view of a plurality of individual fields of view of the scene in order to form a respective plurality of detected light signals, wherein a first subset of the fields of view are illuminated by a light spot of the structured light pattern and a second subset of the fields of view are not illuminated by a light spot of the structured light pattern. The method further comprises identifying noise in a first detected light signal, relating to an individual field of view of the first subset, using a second detected light signal, relating to an individual field of view of a second subset.

The method may further comprise reducing the noise in the first detected light signal, or in a signal derived from the first detected light signal, as a result of said identification.

The first detected light signal may relate to the individual field of view of the first subset, during a time window within which the structured light pattern is projected onto the scene.

The second detected light signal may relate to the individual field of view of the second subset during that same time window. Thus, noise in a first light signal, relating to an illuminated area, can be identified using a second, substantially concurrent light signal, relating to a non-illuminated area. In this context, "illuminated" and "non-illuminated" may be understood to mean "directly illuminated by the structured light pattern" and "not directly illuminated by the structured light pattern", respectively.

The (illuminated) individual field of view (IFOV) of the first subset and the (non-illuminated) individual field of view (IFOV) of the second subset may be selected, by the processor or by another aspect of the LIDAR system, using one or more criteria, in order to identify noise in the first detected light signal using the second detected light signal. For example, they may be selected based on their spatial relationship with one another and/or based on a position of one or both of them, within the structured light pattern and/or within the scene that is to be interrogated.

The individual field of view to which the first detected light signal relates may have a correspondence to the individual field of view, to which the second detected light signal relates. For example, it may be a positional correspondence. For example, they may be adjacent or neighbouring to one another, or may be located within a predetermined distance from one another, or in a predetermined direction from one another. It may be said that they have a predetermined spatial relationship. The method may comprise specifically selecting one or more individual fields of view from each of the first and second subsets, based on their spatial relationship(s), for use in signal comparison and noise identification.

The step of reducing the noise in the first detected light signal, or in a signal derived from the first detected light signal, may comprise subtracting some or all of the second detected light signal from the first detected light signal. It may comprise ignoring, amending, or deleting a point cloud representation of the scene, or of an object or feature in or relating to the scene.

The method may comprise determining whether a predetermined correspondence exists, between the first detected signal and the second detected signal, and only using the second detected light signal to identify noise in the first detected light signal, if said predetermined correspondence exists. The correspondence may be a temporal correspondence. The correspondence may be a match, or a similarity, in any of: signal intensity; signal duration; signal shape; or signal pattern.

The method may be a computer-implemented method.

According to an aspect, a computer program is provided comprising instructions which, when executed by data processing apparatus, causes the data processing apparatus to perform a method according to any of the above aspects. A computer readable medium may be provided, storing the computer program.

There is also disclosed here a light detection and ranging system comprising a light pattern generator, a detection system and a processor. The light pattern generator is arranged to project structured light patterns onto a scene, wherein each structured light pattern comprises an array of light spots. The detection system comprises a plurality of light detection elements, each arranged to detect light from a respective individual field of view of the scene and to output a respective detected light signal. A first subset of the individual fields of view are illuminated by a light spot of the structured light pattern and a second subset of the individual fields of view are not illuminated by a light spot of the structured light pattern. The processor is arranged to identify noise in a first detected light signal, relating to an individual field of view of the first subset, using a second detected light signal, relating to an individual field of view of the second subset. In examples disclosed herein the light pattern generator is a holographic projector but the present disclosure is not limited to holography and the light pattern generator may equally be a vertical-cavity surface-emitting laser, "VCSEL", array for example.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete "image pixels" which form the structure light pattern. For example, each light spot in accordance with this disclosure may be formed using only one image pixel or using a plurality of image pixels. Each light spot in accordance with this disclosure may have any shape and, optionally, may comprise more than one discrete area of light.

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
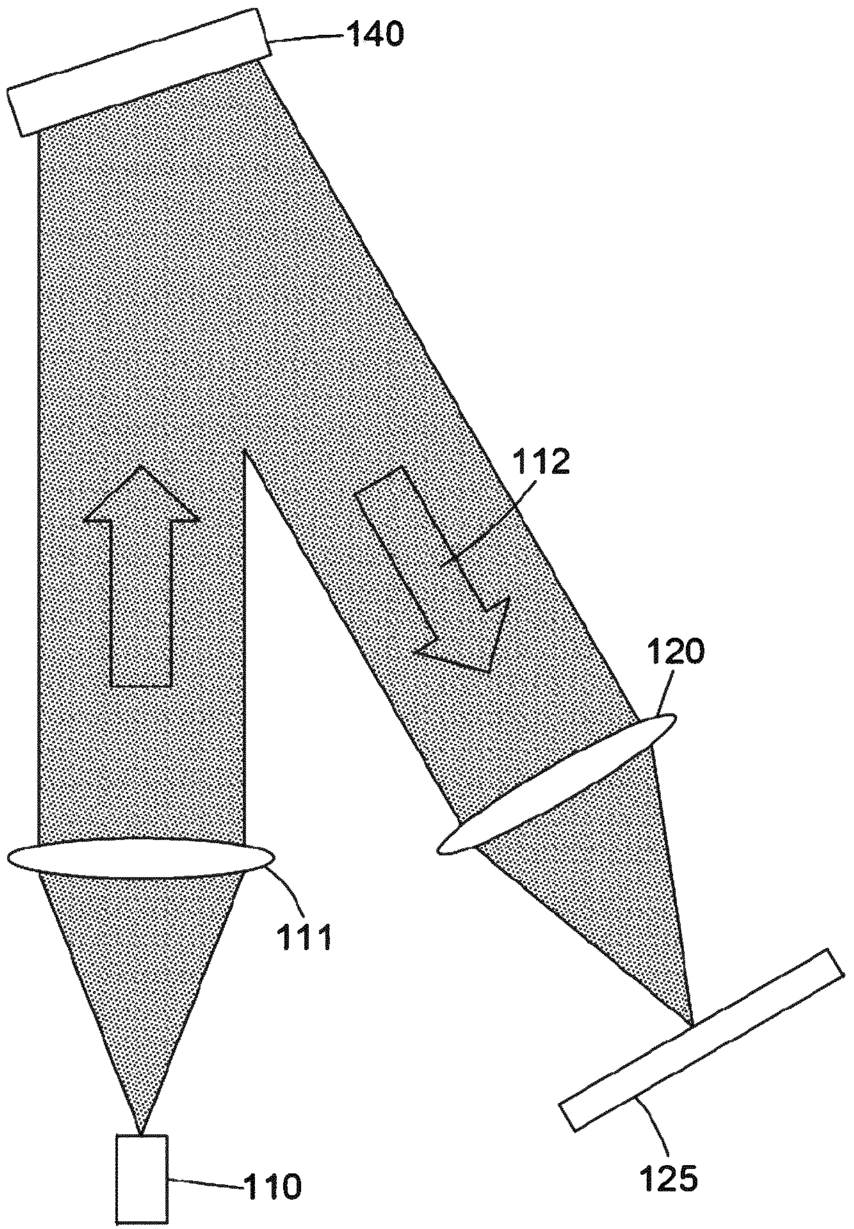
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
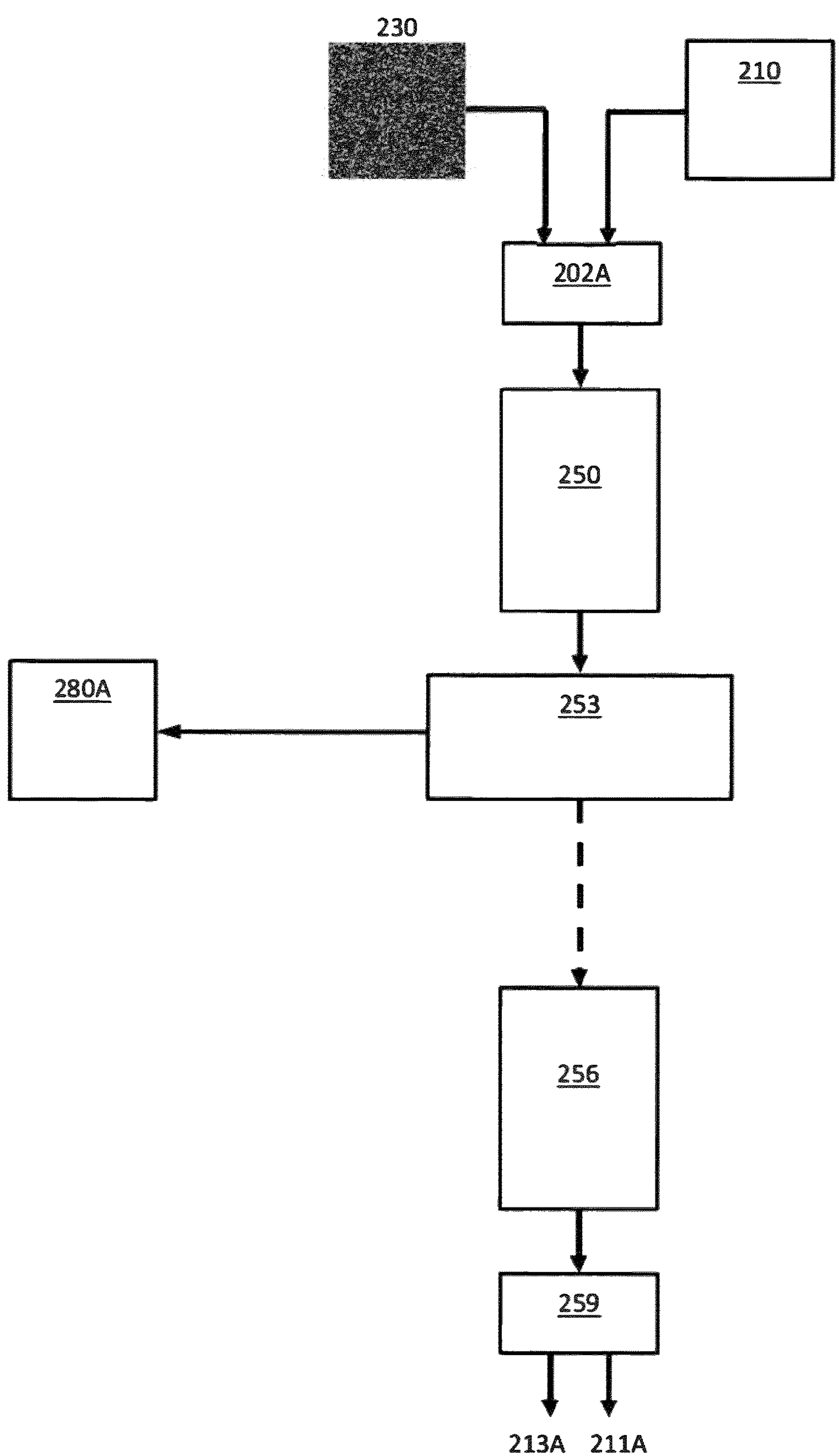
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 409 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
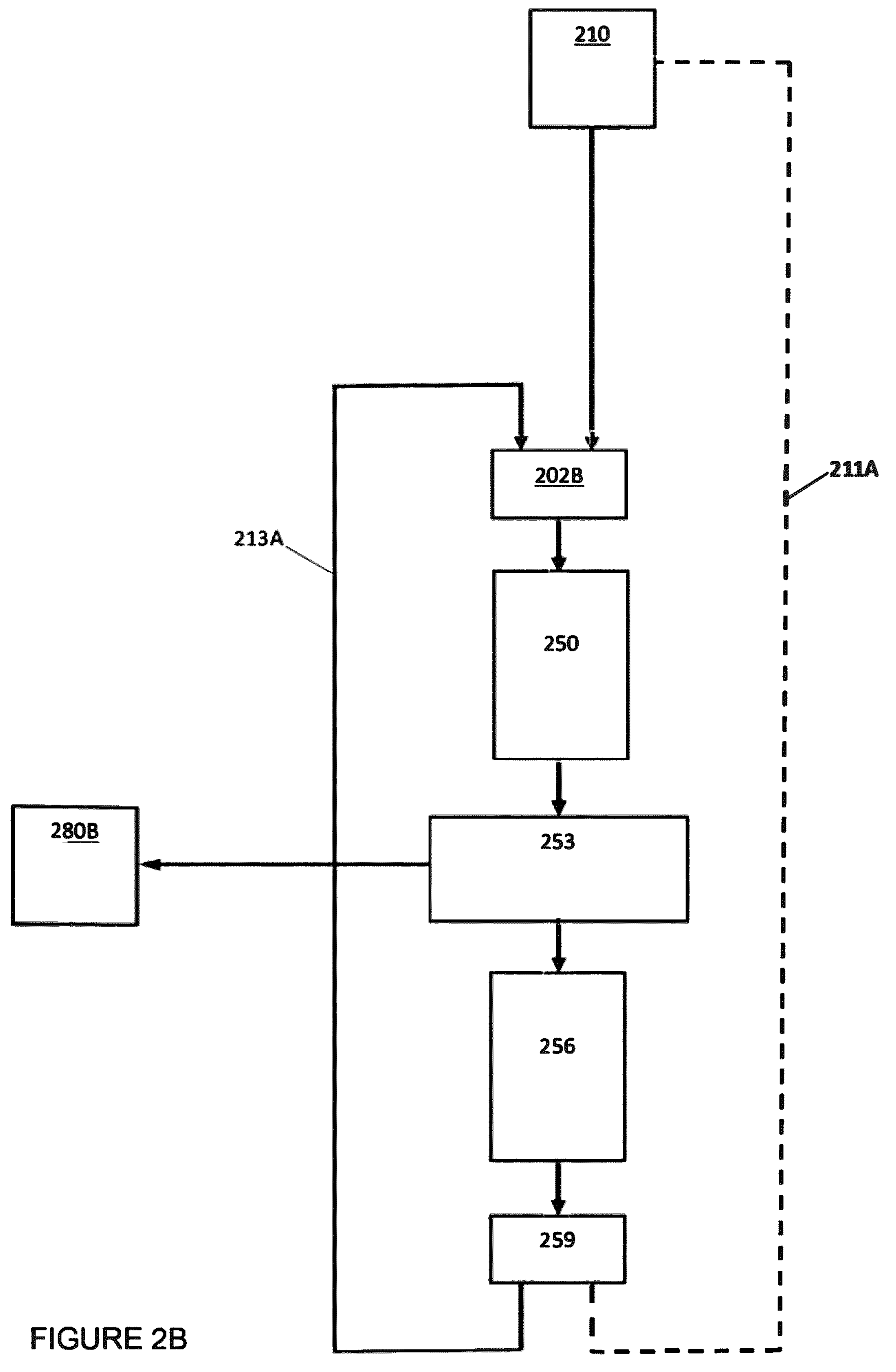
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
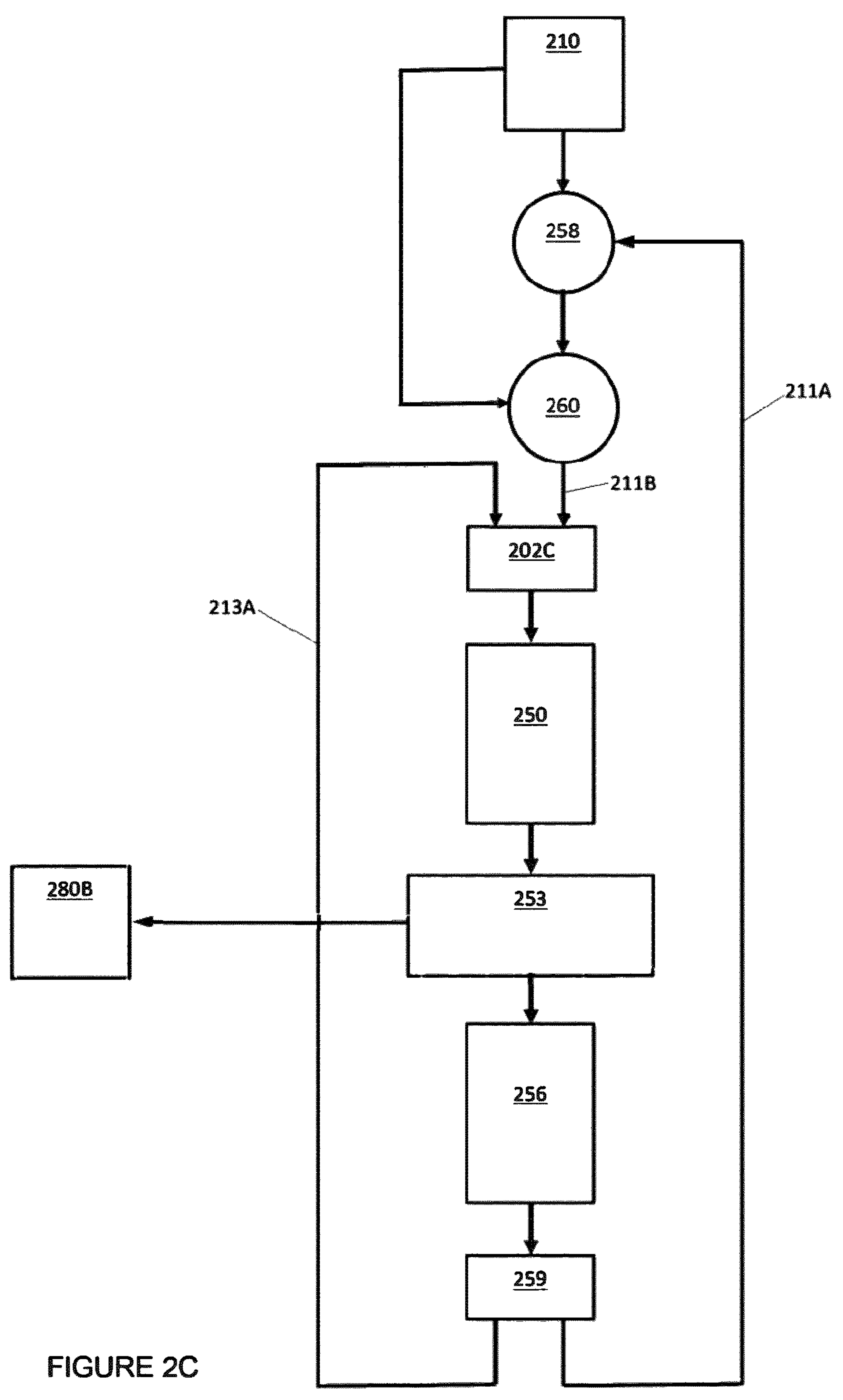
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\psi_n[u, v])\}$$

$$\psi_n[u, v] = \angle F\{\eta \cdot \exp(i\angle R_n[x, y])\}$$

$$\eta = T[x, y] - \alpha(|R_n[x, y]| - T[x, y])$$

where:

F' is the inverse Fourier transform;

F is the forward Fourier transform;

R[x, y] is the complex data set output by the third processing block 256;

T[x, y] is the input or target image;

∠ is the phase component;

ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
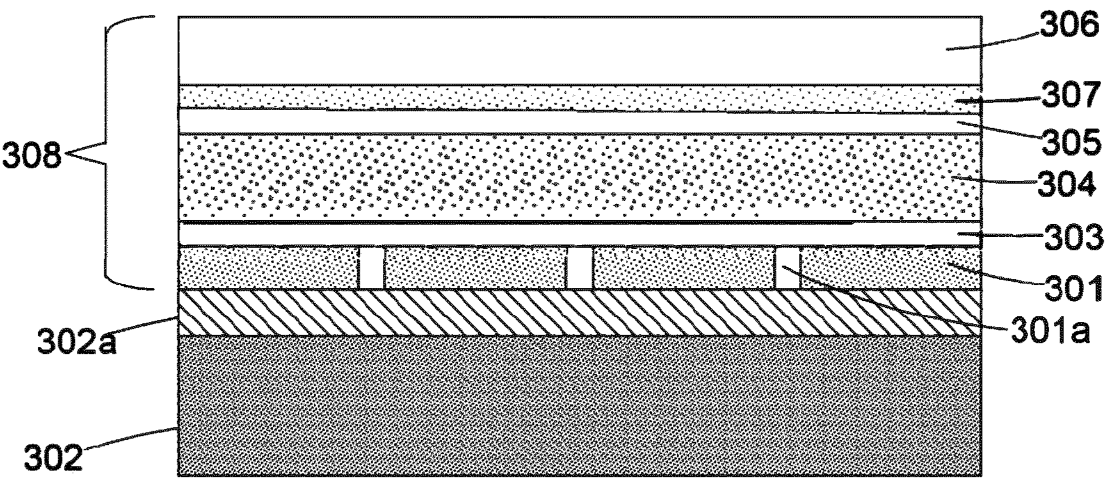
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Light Detection and Ranging

It has previously been disclosed that holographic components and techniques, such as those described herein, may be used to form the basis of a Light Detection and Ranging (LIDAR) system. The skilled person will be aware that, in general terms, LIDAR describes arrangements and methods in which light is used to illuminate and observe or 'interrogate' a target object or scene. For example, the distance to a target may be measured by illuminating the target with laser light and observing or measuring one or more detection signals, which indicate the presence of light that is reflected from the target, using a sensor or detector. In some cases, LIDAR comprises measuring a parameter associated with light that is reflected from the target. For example, the return times of the reflected light can be measured and may be used to form representations, such as three-dimensional (3D) representations, of the scene or a target within the scene. Methods of illuminating and observing a scene or target using LIDAR may be referred to as 'ranging' methods.

WO2019/224052 discloses a holographic projector used to illuminate a target, or scene, or plane, using so-called 'structured light', in order to observe or interrogate that target (or scene or plane) as part of a LIDAR system. For example, the structured light may be characterised by having a particular form and/or shape and/or pattern. The pattern of the structured light arises from a hologram that is displayed by a spatial light modulator and illuminated by a laser light source, within the holographic projector. A holographic projector may be arranged to illuminate a plurality of different holograms in sequence (i.e. one after the other), to dynamically change the structed light pattern that is formed on the target.

In accordance with further advancements disclosed herein, the accuracy of a holography-based LIDAR system may be improved. In particular, light that a LIDAR detector detects, which has been reflected from an observed scene, but which comprises light that did not originate from the light source comprised within that LIDAR system, can be detected or otherwise identified. Such light may be classified as 'noise' or 'interference' light. Moreover, the effects of such noise or interference light may be mitigated, or accounted for, in order to provide a more accurate indication of how light from the current LIDAR scene interacts with the scene, and so to better determine the presence of objects or features of interest, and to more accurately determine the physical characteristics of such objects or features of interest. This can be done in a streamlined and computationally efficient manner, as detailed further below.

Figure 4:
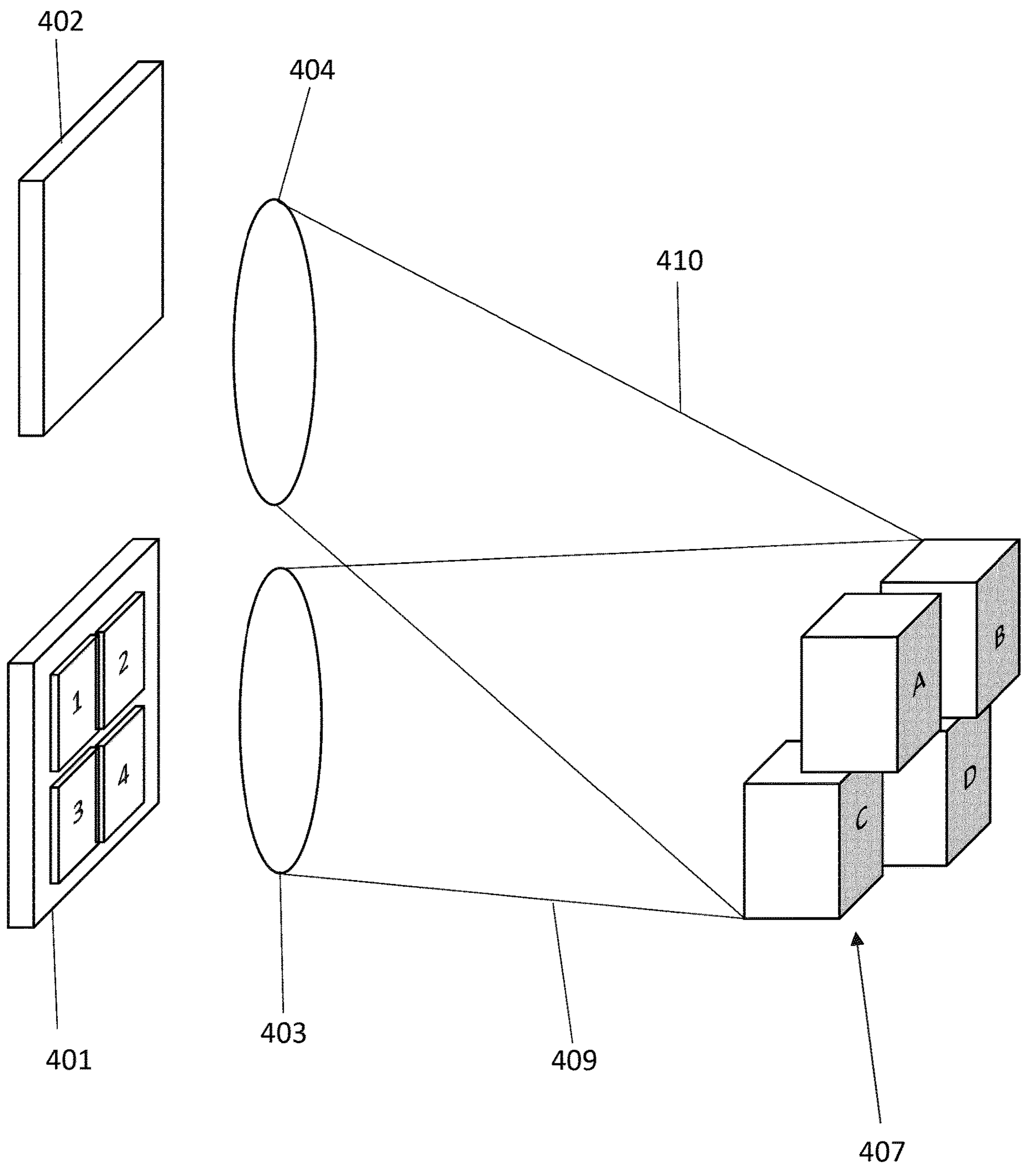
FIG. 4 is a schematic of a combined holographic projector and detector system that may be employed as part of a holographic Light Detection and Ranging (LIDAR) system.

FIG. 4 shows a combined system, comprising a holographic projector and a light detector system. The system may, for example, form part of a LIDAR system.

The holographic projector comprises an SLM 402 and a projection lens 404. The SLM 402 is arranged to display a hologram (or a plurality of holograms) and to be irradiated by a suitable light source, such as a laser diode, in order to form a holographic reconstruction of the displayed hologram(s), at a given time. The SLM 402 may be configured to display a plurality of holograms, at different respective times, and/or it may be configured to display different holograms on different respective areas or zones of the SLM 402, substantially simultaneously. In some arrangements, the SLM 402 may be configured to display a sequence (or series, or plurality) of holograms, one after the other, so that multiple different structured light patterns are formed on a scene 407, in sequence.

The holographic projector further comprises a Fourier transform lens (not shown) arranged to form an 'intermediate' holographic reconstruction in free space (also not shown) of an irradiated hologram, between the SLM 402 and projection lens 404. The projection lens 404 forms an image of the intermediate holographic reconstruction. That image may be a magnified image, and comprises a a structured light pattern, corresponding to the irradiated hologram, which is projected onto the scene 407. In a LIDAR system, the scene 407 typically comprises one or more objects or features that are to be observed or 'interrogated'. The projection lens 404 is optional. For example, the holographic reconstruction may be directed projected into the scene such that an intermediate holographic reconstruction is not formed and imaged by a projection lens.

For shorthand, the image formed by projection lens 404 in FIG. 4 may also be referred to herein as a 'holographic reconstruction', even though it is actually an image of an intermediate holographic reconstruction. Moreover, the image plane on which that image is formed (within the scene 407), may also be referred to herein as a 'holographic replay plane'. The area, on that holographic replay plane, within which the holographic reconstruction is formed may also be referred to as a 'holographic replay field'. However, more precisely, in some embodiments, the holographic reconstruction is projected onto the scene and, in other embodiments, an image of the holographic reconstruction is projected onto the scene using a projection lens and an intermediate holographic reconstruction. Generally, it is simply said that the structured light pattern is projected onto the scene.

The holographic projector also comprises a source of light (not shown in FIG. 4), upstream of the SLM 402, arranged to transmit light towards the SLM 402 to irradiate a displayed hologram. The light may be infra-red (IR) light, visible light or ultra-violet light, dependent on application requirements. In embodiments related to LIDAR, the light source may be infra-red. In embodiments related to head-up display, the light source may be visible.

The scene 407 that the holographic projector is arranged to direct structured light onto, in this example, is not planar, but has a depth. The holographic projector may therefore be arranged to dynamically adjust its operating parameters in order to vary the precise location of the holographic replay field and holographic replay plane, to explore different respective depths within the scene 407. A lensing function may be added to the hologram 402, in order to maintain focus of the structured light pattern on the plane of interest, at any given time.

The distance between the SLM 402 and the holographic replay plane (i.e. projected structured light pattern), at any given time, may be referred to as the 'range' of the system. The range may be measured along a (virtual) line that joins the centre of the SLM 402 (and of a hologram displayed thereon) to the centre of the holographic reconstruction, on the holographic replay plane. This line may be referred to as a 'projection axis.' Therefore, it may be said that the holographic projector of FIG. 4 may be controlled (for example, using a lensing function or a plurality of lensing functions) so as to vary the range along its projection axis, to enable observation of multiple planes, and thus multiple depths, with a target or scene.

The holographic replay field, within the scene 407, is represented in FIG. 4 by four discrete light areas (A, B, C, D), but this is an illustrative example only and should not be regarded as limiting. There is not a one-to-one correlation between the pixels of a displayed hologram and the discrete light areas of the holographic replay field. Instead, all the hologram pixels contribute to all areas of the holographic replay field.

The SLM 402 and projection lens 404 are decentred in FIG. 4. This is to enable a holographic light cone 410, travelling from the projection lens 404 towards the observed scene 407, to overlap with a reflected structed light cone 409, travelling from the scene 407 back towards the imaging lens 403 and light detector 401.

The light detector system comprises a light detector 401 and an imaging lens 403. The light detector 401 comprises a plurality of individual light detecting elements arranged in an array. There are four light detecting elements in the example shown in FIG. 4, wherein those light detecting elements are respectively numbered 1 to 4. The skilled person will appreciate that this number of light detecting elements is merely an example, and that other sizes of array and other numbers of light detecting elements are contemplated.

The light detector 401 may comprise, for example, a charge-coupled device (CCD) camera, comprising an array of CCD elements. Alternatively, the light detector 401 may be a single-photon avalanche diode (SPAD) array comprising an array of SPAD elements.

The light detector 401 is arranged to receive reflected light from the scene 407. In the arrangement of FIG. 4, the observed scene 407 comprises objects labelled A, B, C and D, wherein not all of the labelled objects are located at the same distance from the light detector 401 as the respective others. In this example, object C is closest to the light detector 401, objects A and D are the next-nearest, at the same distance from the light detector 401 as one another, and object B is the furthest from the detector 401. The light from the observed scene 407 travels via the imaging lens 403, towards the light detector 401. The projection lens 404 in this example has sufficient depth of focus such that the structured light pattern, which it forms on the observed scene 407, is "in-focus" on each of A, B, C and D at the same time, despite them not being co-planar with one another. The holographic light 410 is reflected by the elements A, B, C and D within the observed scene 407 and the resulting reflected structured light 409 travels towards the imaging lens 403 and on towards the light detector 401.

Each individual light detecting element (1, 2, 3, 4) of the light detector 401 in FIG. 4 is arranged to receive light from a single respective corresponding object (A, B, C, D) in the observed scene 407. Each light detecting element in the example of FIG. 4 is arranged only to receive light from its corresponding object and thus not to receive light from any of the 'other' objects within the observed scene 407. That is; the optics of the light detector system are arranged so that element 1 receives light from object A only, element 2 receives light from object B only, element 3 receives light from object C only and element 4 receives light from object D only. It may therefore be said that there is a one-to-one correlation between an individual light detecting element (1, 2, 3, 4) and its corresponding object (A, B, C, D) within the observed scene 407, although the light detecting elements and the objects may have different respective sizes. Alternatively, element 4 may receive light from object A only, element 3 may receive light from object B only, element 2 may receive light from object C only and element 1 may receive light from object D only.

The skilled person will understand that various types of optical system may be used to provide the one-to-one correlation between an individual light detecting element and its corresponding object within the observed scene 407. For example, in embodiments, the optical system may comprise a single lens (as in a camera), or a micro-lens array where each micro-lens is associated with an individual detector. But any suitable photodetector comprising an array of light sensing elements is possible and may be used for this purpose.

When light from the observed scene 407 is received by the detector 401, one or more of the light detecting elements may output a signal to indicate the presence of the light, and may also indicate a characteristic of the light, such as its brightness and/or the size or shape of a detected light spot (or other detected light form). The structured light pattern may be ON-OFF gated, to provide switching of the light response signals. The light response signals may be transmitted to a processor or controller, for use in computation and/or for storage or display purposes. Thus, for example, a time of flight (TOF) value may be calculated for light travelling to and/or from each object (A, B, C, D) within the observed scene 407, based on the light response signal output by the corresponding light detecting element.

The arrangement of FIG. 4 may thus be provided as part of a light detection and ranging, "LIDAR", system, which can be arranged to scan or survey a scene. This is discussed further in relation to subsequent figures, herebelow.

LIDAR Noise Reduction

Whilst the system in FIG. 4 is shown and described as having just the holographic light cone 410, comprising structured light emitted by the SLM 402 and projected by the projection lens 404, incident on the observed scene 407, the present inventor has recognised that, in a real-world situation, there are likely to be other sources of light in the vicinity of a scene of interest. As a result, light other than that of the holographic light cone 410 may be incident on the discrete light areas (A, B, C, D) of the scene 407, and reflected towards the light detector 401 of a holographic system, such as a LIDAR system.

For example, if a holographic LIDAR system is comprised within a vehicle, for example as part of an automotive satellite navigation system, it is possible that one or more other vehicles on the same road, at a given time, will also have its own holographic LIDAR system, and will thus also be outputting structured light patterns. A feature of holographic LiDAR systems is their capability to focus on a feature "of interest" in a scene, such as an unexpected obstacle in the road. The present inventor has therefore recognised that multiple vehicles on a road are likely to have similar "interest" in the same (i.e. in a common) feature, such as an unexpected obstacle. It is therefore reasonable to expect that the important, unexpected and/or interesting features in a scene that a vehicle's LIDAR system is currently observing will receive illumination (potentially a large amount of illumination) from other LiDAR systems at the same time, potentially leading to interference problems.

Typically, a LiDAR system (for example, in an automotive application) will be able to detect photons arising from background light such as sunlight and/or street lighting and will also be able to detect 'interference' light, arising from structured light emissions from other LiDAR systems, in addition to detecting its own structured light, which it uses for observing a scene. The present inventor has recognised that it is beneficial for a holographic system, such as a LiDAR system, to be able to distinguish between its own light and background light and/or interference light. An improved holographic LIDAR system and method is thus presented herein.

Figure 5:
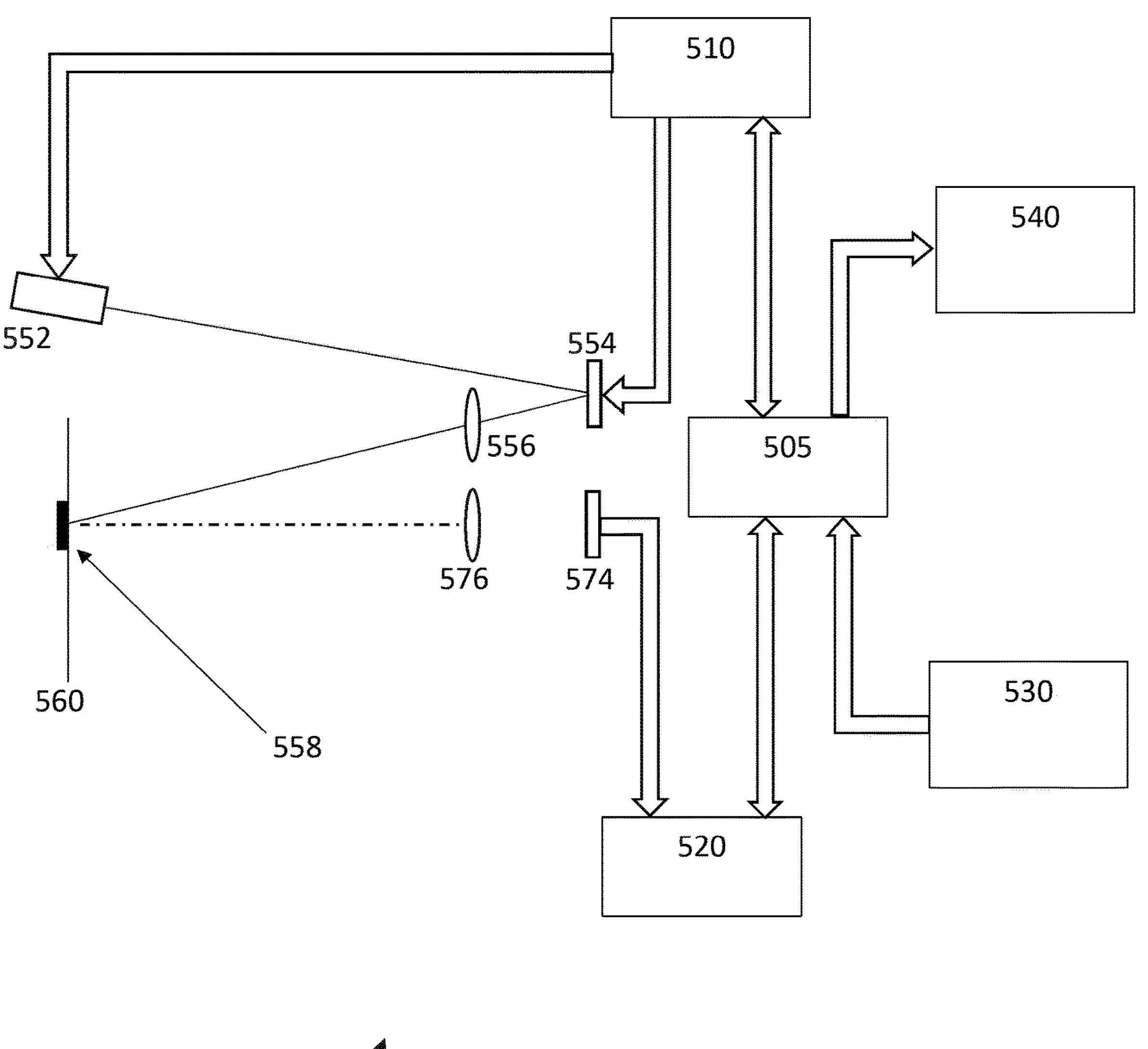
FIG. 5 is a schematic of a Light Detection and Ranging (LIDAR) system, in accordance with embodiments.
Figure 6:
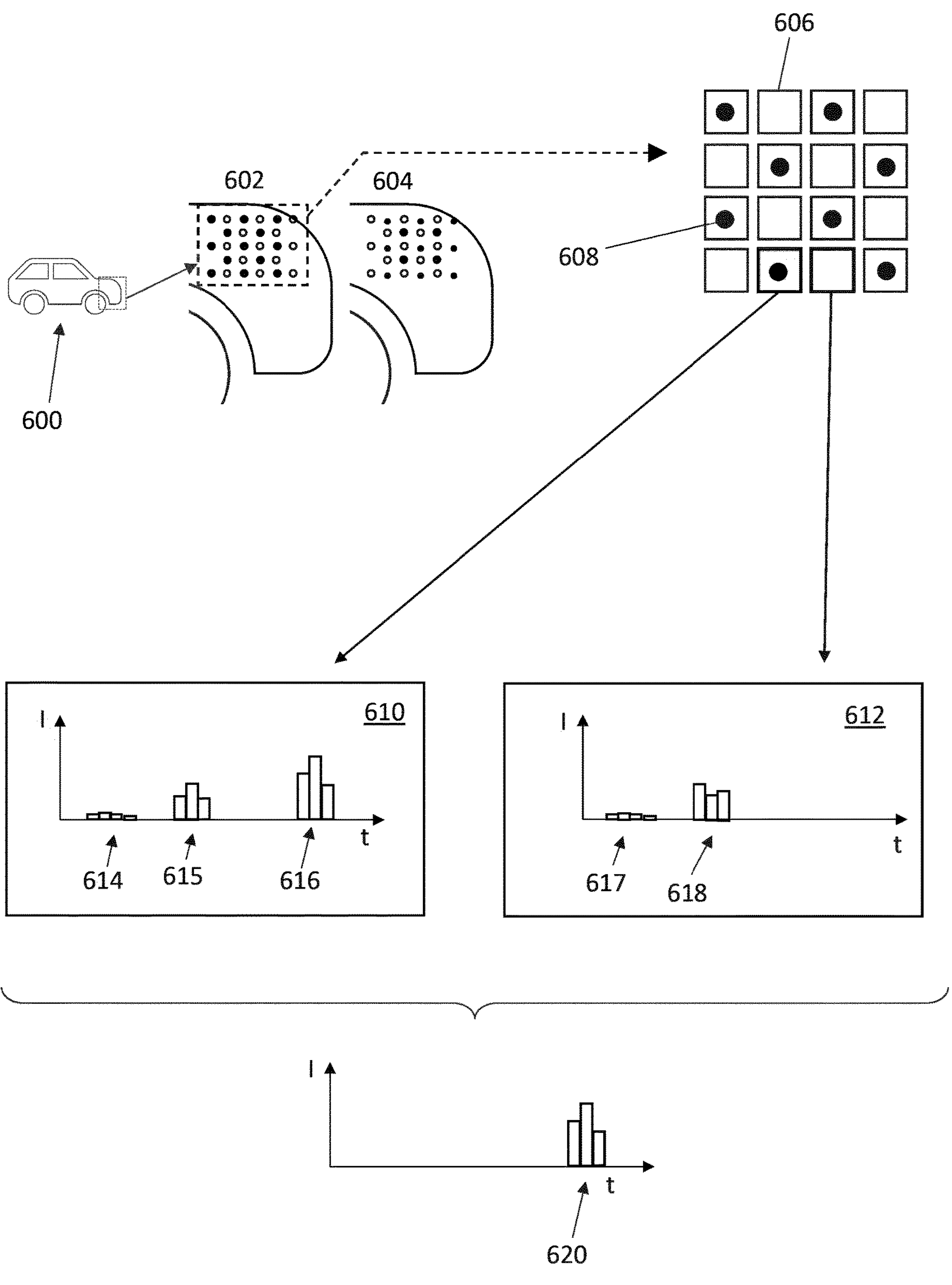
FIG. 6 shows two structured light patterns from a Light Detection and Ranging (LIDAR) system, a scene illuminated by one of those structured light patterns and light signals from the scene, in accordance with embodiments.

FIG. 5 comprises a system diagram for an example of a LIDAR system 500 that can embody the recognitions made by the present inventor, which are detailed further in relation to FIG. 6, herebelow. The LIDAR system 500 may be provided, for example, in a vehicle, as part of a navigation system, or in a portable device or in a range of other applications.

The system 500 comprises an SLM 554 and an array detector 574, which are provided coplanar with one another but spatially separated from one another, on that common plane. The SLM 554 is arranged to display one or more holograms and is provided in conjunction with a projection lens 556. The detector 574 is provided in conjunction with an imaging lens 576. There is a light source 552 which in this example comprises a laser diode. The laser diode 552 is arranged to direct light towards a displayed hologram on the SLM 554, which reflects structured light towards a holographic replay plane 560, via the projection lens 556. The reflected structured light forms a structured light pattern holographic replay plane 560, which represents the illuminated hologram. As described above in relation to FIG. 4; an intermediate holographic reconstruction is actually formed in free space in this arrangement, between the SLM 554 and the projection lens 556. Therefore, the structured light pattern (also referred to herein as a 'holographic reconstruction') that is formed within a holographic replay field 558, on the holographic replay plane 560, is actually an image of that intermediate holographic reconstruction.

The laser diode 552 is positioned and oriented so that the incoming light arrives at an acute angle to the central lateral axis (not shown) of the SLM 554. As a result, the structured light is also reflected away from the SLM 554, via the projection lens 556, at an acute angle, towards the holographic replay plane 560.

Although not explicitly shown, the SLM 554 may include a lensing function that enables the holographic reconstruction to be focused at different respective distances, away from the plane of the SLM 554 and detector 574. A plurality of different lensing functions, each with a different respective focal length, may be provided, stored in a suitable repository, for selection if/when needed to achieve a desired range for the SLM 554. In other embodiments, the projection lens has sufficient depth of focus such that fine-tuning of the focus using a software lens is not necessary.

The control aspects of the system 500 include a system controller 505, a hologram controller 510, and a detection controller 520. The system controller 505 is configured to receive inputs from, and provide outputs to, both the hologram controller 510 and the detection controller 520. There may also be other inputs 530 provided to the system controller 505, and/or the system controller 505 may provide one or more other outputs 540. Although the system controller 505, hologram controller 510, and detection controller 520 are shown in FIG. 5 as being physically distinct from one another, this is a schematic/functional representation only. In practice, any suitable entity such as a computer or other processor may be provided to carry out the role of the system controller 505, and that same computer or processor may act as either the hologram controller 510 and/or the detection controller 520. The entity that acts as the system controller 505 may also have other roles, for example it may provide control for other aspects of a vehicle or other system, in which the LIDAR system is comprised.

In general terms; the system controller 505 is configured to control, via the hologram controller 510, the selection of an appropriate hologram (and, when applicable, a software lens and/or a software grating) for display on the SLM 554, and to control the illumination of the SLM 554 by the laser diode 552.

The system controller 505 is in communication with the detection controller 520, which in turn is in connection with the array detector 574. The detection controller 520 is configured to receive signals from the array detector 574, which indicate the presence of light on one or more of its light detecting elements. The signals from the array detector may also indicate one or more characteristics or parameters associated with the detected light. For example, they may indicate a distance to a feature of interest. For example, the array detector 574 may communicate arrival times of one or more light pulses that are reflected from a feature, towards the array detector 574. The detection controller, and/or the system controller 505 may use those arrival times—for example, in conjunction with pulse emission times from the laser diode 552, which the system controller 505 would have access to and may be configured to control—in order to calculate times of flight (TOF's) for those light pulses, and in turn to use those TOF's to calculate a distance or distances of the target, away from the plane of the SLM 554 and array detector 574. Such information may be used to form a picture of features within an observed scene. The light detection signals from the array detector 574 may also indicate a brightness of the detected light and/or a size and/or a shape of a light spot or other light formation, which is incident on one or more of the light detecting elements of the array detector 574.

The present inventor has recognised that the system 500 may be controlled so as to enable the system controller 505 (or any other suitable processor or controller) to distinguish between light that has been emitted by its own light source (laser diode 552)—in particular, structured light that has been reflected by the SLM 554—and light that has come from a different source. This may be described as the system 500 differentiating between a so-called 'valid photon' and one or more 'background photons' or 'interference photons' in the detected light. Such control may comprise control of the structured light pattern (or patterns), which the system 500 projects on to a scene, and exploitation of the knowledge of the structured light pattern (or patterns), when assessing one or more detected light signals. This can be further understood in relation to FIG. 6.

FIG. 6 shows two structured light patterns from an improved holographic LIDAR system, a scene illuminated by one of those structured light patterns and light signals from the scene.

FIG. 6 shows a vehicle, specifically a car 600 in this example, but any vehicle is contemplated. The car 600 is interrogated by a holographic LIDAR system. The holographic LIDAR system itself is not shown in FIG. 6, but is similar to the system of FIG. 5.

The holographic LIDAR system is arranged to display a plurality (or series, or sequence) of holograms on its display device—such as an SLM, for example an LCOS SLM—and to illuminate (or 'irradiate') those holograms with laser light, which the display device reflects towards a scene including car 600. Light is then reflected by the car 600 and can be detected by one or more light detectors, within the holographic LIDAR system, as detailed above in relation to previous Figures.

The LIDAR system is configured to control operation and illumination of the SLM so that the structured light pattern (which may also be referred to as an 'illumination pattern') that it projects on to a scene changes, with time, under the control of a suitable controller. For example, a plurality of holograms may be displayed, one after the other, on the same display device and illuminated in turn. Alternatively, or additionally, two different holograms may be displayed on two different respective display devices (or on two different respective portions or zones of a common display device), and may be alternately illuminated. For example, two different light sources, such as two separate laser diodes, may be provided within the LIDAR system, each to illuminate a different respective display device or a different respective zone, within a display device. Alternatively, or additionally, a display device may display the same hologram for a certain period of time, but some or all of the pixels of the display device may be switched on and off, during that period of time, in order to change the structured light pattern. Such switching may comprise a pseudo random binary sequence (PRBS). Alternatively, or additionally, a dither pattern may be applied to a hologram on an SLM, for example using two or more gratings, in order to provide a repetitive shift of the position of the light spots, or other light structures, within a structured light pattern, as formed on an observed scene, and thus to change which regions within the scene are (and are not) illuminated by the structured light pattern, over time.

In FIG. 6, first 602 and second 604 structured light patterns, which the LIDAR system is configured to generate and to project onto the car 600, are shown. These structured light patterns 602, 604 are shown by way of example only and should not be regarded as limiting. Any size, shape, and arrangement of light and dark areas, within a structured light pattern, are contemplated.

As described above in relation to FIG. 4, the holographic replay field (and, thus, the scene) within which a holographic reconstruction is formed by the LIDAR system can be regarded as having an array of discrete light receiving areas, each of which may be detectable by one or more respective light detecting elements, within a light detector comprised in the LIDAR system. The discrete light receiving areas may also be referred to as 'individual fields of views' of the respective (group of) light detecting elements. For example, there may be a one to one correlation between the discrete light receiving areas and individual light detecting elements (or individual groups of light detecting elements), within a light detector. As shown in the magnified version of the first structured light pattern 602 in FIG. 6, the discrete light receiving areas may be represented by an array, or grid, of light receiving areas, within the scene. As the skilled person will appreciate, the particular size and shape of the array, and of the light receiving areas therein, as shown in FIG. 6, is just an illustrative example. Other sizes, shapes and arrangements are also contemplated.

Both of the structured light patterns 602, 604, in the example of FIG. 6 comprise a 'checkerboard' pattern of light spots 608 in each of two directions (shown as the horizontal and vertical, or x and y, directions in FIG. 6). For the avoidance of doubt, the open/hollow circles shown in structured light patterns 602, 604 represent "off" areas of the light pattern (that is, areas that are not illuminated) and the closed/solid circles shown represent "on" areas (that is, areas that are illuminated—i.e. light spots). The "off" areas are also shown as empty individual fields of view such as individual field of view 606. The two structured light patterns 602, 604 are the inverse of one another—wherein pixels that comprise a light spot 608 in the first structured light pattern 602 are dark in the second structured light pattern, and vice versa. The present disclosure is not limited to structured light patterns comprising checkerboard patterns, nor to two structured light patterns that are the inverse of one another. Other types of patterns, and other changes, and combinations of changes, of the illumination of individual light receiving areas on a scene, between a first structured light pattern and a second structured light pattern, are contemplated. Moreover, any number of different structured light patterns may be projected on to a scene, over time, by a LIDAR system as disclosed herein.

The present inventor has recognised that, if background light and/or interference light (which, for simplicity, we will refer to herein collectively as 'noise') is present in a scene that is being observed by a holographic LIDAR system, it is possible (and, in some cases, likely) that the noise will affect more than one of the discrete light receiving areas on the scene. Moreover, it is possible (and, in some cases, likely) that two adjacent light receiving areas—or two light receiving areas that are relatively close to one another—will be similarly affected by that noise. Therefore, a method is disclosed herein wherein one or more detected light signals from each of two light receiving areas, within a scene, may be compared to one another in order to identify light noise within one or both of those light receiving areas. The detected light signals from each of the two light receiving areas may be output substantially simultaneously with one another, or at least within a common time window, such that noise identified in one may be (and, often, is likely to be) also present in the respective other, at substantially the same time or at least within the common time window.

Each light receiving area (or, each individual field of view IFOV) may comprise a part of a scene, or part of a holographic replay field, within which a holographic reconstruction is formed, by the LIDAR system. Each light receiving area may comprise a regular shape or an irregular shape. The two light receiving areas, whose signals are compared, need not be the same size or shape as one another. The two light receiving areas may be adjacent to one another or may be located within a predetermined distance from one another, or may have another predetermined positional correspondence or other correspondence to one another.

Alternatively, or additionally, the 'two light receiving areas' may in some cases comprise the same physical area, but at different times, wherein the LIDAR system is arranged to illuminate that area differently at each of those two respective times.

In order to make an informed comparison of their light signals, for deducing the presence of noise, the two light receiving areas should be illuminated by the LIDAR system in a known manner, at the time or times at which their detected light signals are obtained and compared. For example, the LIDAR system may be arranged to illuminate one of the light receiving areas and not to illuminate the other light receiving area, at a time at which their detected signals are to be obtained and compared. This example is illustrated in FIG. 6, wherein the magnified view of the first structured light pattern 602 shows the middle two individual fields of views (IFOV) of its bottom row as being one illuminated IFOV (having a light spot 608) and one non illuminated IFOV (being empty, thus comprising a dark region 606). Therefore, those two IFOVs comprise adjacent regions of the scene, one of which is intentionally illuminated by the LiDAR system; the second of which is intentionally not illuminated.

The light detector results from the illuminated IFOV and the non-illuminated IFOV, within a time window during which the holographic reconstruction on the scene comprises the first structured light pattern 602, are shown on first 610 and second 612 histograms respectively, in FIG. 6. The two sets of results are obtained over substantially the same time window (or time period) as one another. According to the presently disclosed methods, the light detector results from the non-illuminated IFOV may be used to identify and to reject noise, within the light detector results from the illuminated IFOV. As a result, the LIDAR system is able to better distinguish the effect on its own structured light, as a result of being incident on the scene, and so may make more accurate determinations about the scene.

As can be seen in FIG. 6, in this particular example (which is illustrative only and should not be regarded as limiting) the light detector signals from the illuminated IFOV comprise first 614, second 615 and third 616 sets of light signals. These first 614, second 615 and third 616 sets of light signals may instead be regarded as signal components, or sub-signals, which combine to form a single signal (or signal set or signal pattern). The light detector signals from the non-illuminated IFOV, for the same time window, comprise first 617 and second 618 sets of light signals only. Again, these first 617 and second 618 sets of light signals may instead be regarded as signal components, or sub-signals, which combine to form a single signal (or signal set or signal pattern).

It can be seen that the first 614 and second 615 sets of light signals for the illuminated IFOV occur at similar times (i.e. have similar times of flight between the scene and the LIDAR detector) as the first 617 and second 618 sets of light signals for the non-illuminated IFOV. Also, the respective intensities of the first 614 and second 615 sets of light signals for the illuminated IFOV are similar to (though not entirely identical to) the respective intensities of the first 617 and second 618 sets of light signals for the non-illuminated IFOV. In accordance with the presently-disclosed methods, in this example the timing similarities (and possibly also the intensity similarities) between the first 614 and second 615 sets of light signals for the illuminated IFOV and the first 617 and second 618 sets of light signals for the non-illuminated IFOV may be used to conclude that, for the illuminated IFOV, the first 614 and second sets 615 of signals should be regarded as noise and only the third set of signals 616 should be regarded as being 'true' or 'valid' light, for the purposes of that LIDAR system. Therefore a 'net' or resultant light detector signal 620 can be determined for the illuminated IFOV, as shown at the bottom of FIG. 6. A controller or processor for the LIDAR system may use the net light detector signal 620, and ignore or reject the noise, when making determinations about the scene.

This method, described in relation to FIG. 6 above, can be repeated, for example on a cyclical basis, in order to provide dynamic noise identification. For example, the LIDAR system in FIG. 6 may be arranged to repeat the above-described steps when the second structured light pattern 604 is displayed on the SLM. When the hologram on the SLM changes, for example when it changes position due to the presence of a grating and/or when it is replaced by a different hologram, the LIDAR system can repeat the process, taking into account which IFOVs (or light receiving areas) of a scene are illuminated and which are not illuminated, at any given time. For every frame of operation, comparisons can be made for multiple different pairs of illuminated and non-illuminated regions, within the scene, in order to provide noise identification across the entire scene, or across selected parts of the scene. Light detection signals for the same non-illuminated region may be compared to the light detection signals for two or more different respective illuminated regions, and vice versa. Some embodiments comprise combining the data from the four non-illuminated positions above/below/left/right of the detector. In this case, the 'noise' measurement from the non-illuminated pixel supports noise identification in four neighbouring pixels.

It will be appreciated that the example shown in FIG. 6 indicates that both the illuminated IFOV and the non-illuminated IFOV will receive noise light from a particular source, and will reflect it towards their respective light detecting elements of the light detector, at substantially the same time as one another. For example, such noise light may comprise photons originating in the same pulse of light from a competitor LIDAR system. Whilst this is a possible scenario, in other cases there may not be time correlation, or at least not precise time coincidence, between the receipt of the same noise (or, noise from the same source) at two different IFOVs, or light receiving areas or regions, of a scene. Nonetheless the background data from a non-illuminated region can still be useful, for example to support noise rejection algorithms for an illuminated region.

Noise can also be due to secondary reflections of the light emitted from the SLM. For example, light from the SLM may be reflected off a reflective object and then incident on the region of the scene within the IFOV of both the illuminated region and non-illuminated region of the scene. This light will be time-correlated with the LiDAR emission and have a (false) time-of-flight longer than for the scene (due to the longer path length associated with the reflection). Due to the reflection this light can span both IFOV and therefore the method of the present disclosure can be very effective.

In some cases, the light detection signals for a non-illuminated region and an illuminated region of a scene, irradiated by a LIDAR system, may be monitored over a predetermined time period, for example over a number of frames of operation of the LIDAR system, to accommodate the possibility that different regions may encounter the same noise (or, noise from the same source) during different respective frames. This may enable such noise to be detected and, where appropriate, to be ignored or rejected by the LIDAR system.

A LIDAR system may be configured to be self-learning, wherein it may come to recognise certain light detecting signals as being indicative of noise, based on signals that were monitored and processed for subsequent frames of operation (or, during previous operating instances of the LIDAR system).

The LIDAR system may be configured to apply rules that determine the extent to which a light detection signal for a non-illuminated region should resemble a light detection signal for an illuminated region, in order for those two light detection signals to be regarded as representing noise in the illuminated region. For example, the rules may set out whether the two signals must be received at the same time, or separated in time by no more than a pre-determined amount, and/or they may set out similarity requirements for the intensities of the two signals, and/or their duration and/or the required proximity of the illuminated region and the non-illuminated region, to which the signals relate, and so on.

In some cases, the same physical area of a scene may be intermittently illuminated and non-illuminated, for example over a number of frames of operation of a LIDAR system. Alternatively, the area may be illuminated differently, due to the irradiation of two different respective holograms, from one frame to the next. For example, the size or shape or number or intensity of one or more light spots on the area may change, between successive frames. Therefore, the light detection signals for the one or more corresponding light detecting elements of the light detector, which detect light from that area of the scene, may be monitored over those frames of operation, to deduce the presence of noise in a similar manner to that which is described above for the illuminated and non-illuminated IFOVs in FIG. 6.

In some embodiments, the first structured light pattern 602 and second structured light pattern 604 are formed using the same hologram. In these embodiments, a grating function may be used to displace the entire holographic replay field in order to form the two complementary patterns. For example, a first diffractive pattern may comprise a first grating function and a hologram and the second diffractive pattern may comprise a second grating function and the hologram, wherein the second grating function is different to the first grating function. Alternatively, only one of the diffractive patterns may comprise a grating function. The grating function provides a translation of the holographic replay field in one direction—e.g. x-direction or y-direction, wherein the holographic replay plane is an x-y plane. Advantageously, if a system were based on real-time bespoke hologram calculation, this approach halves the number of bespoke holograms that need to be calculated in real time.

It will be appreciated that a LIDAR system will often be required to make observations about a scene—and, in some cases, to enable creation of three-dimensional images of the scene—on a dynamic basis. Moreover, in applications such as moving vehicles, the noise that is present in a scene may vary quite rapidly, as the vehicle travels. Therefore, any noise deduction and mitigation may have to be carried out very quickly. In practice, this may therefore put limits on whether and to what extent the signals from the same light detecting element, over a number of frames, may be used for noise mitigation purposes.

Although particular examples have been illustrated and described herein, other examples and arrangements are contemplated. For example, in FIG. 6 noise rejection is shown as being done at a 'histogram stage' of a LIDAR's operation, wherein the histograms represent time and intensity of the received light signals but do not visually represent the observed scene per se. Alternatively, the noise rejection could be done at another stage, for example at a 'point cloud stage', during which point cloud representations of an illuminated region and a non-illuminated region of a scene are being created, in order to form a three-dimensional representation of the scene. If, in such an example, two similar point cloud results are obtained from the non-illuminated region and the illuminated region, it may be considered likely that this is a 'false' point cloud result, and does not represent light from the present LIDAR system being reflected from the scene, but instead represents background light or interference light from another holographic source.

Thus, methods, apparatus and systems are provided for reliable and accurate noise identification (and noise rejection or mitigation, where appropriate) on a dynamic basis. This can be implemented using detection elements that are already present in a LIDAR system, and based on signals that such light detection elements are inherently configured to output, or can be readily arranged to output. The comparison of the light detection signals from those light detection elements may be carried out by a suitable controller or processor, without placing undue computational burden on it, and whilst still enabling it to carry out other processes, which may be required for the LIDAR system or within a wider system within which it is comprised.

The methods, apparatus and systems described herein enable a holographic LIDAR system to provide 'flash' type LIDAR wherein a whole scene, which is to be observed, is illuminated by the structured light from the LIDAR system at once. As detailed above, because the structured light pattern can be spatially varied, from one IFOV (or area, or region) of a scene to the next, this enables noise mitigation to happen, even for a single flash of structured illumination. This is not possible with conventional (continuous illumination) flash LiDAR, which does not use structured light and therefore cannot be varied and switched, or provided in patterns, in the manner that structured light can be, as described herein.

Although the examples described herein refer to LIDAR systems, the described methods may be applied to other types of holographic system as well, wherein a comparison of the light (or, of the light detection signals relating to) an illuminated region and a non-illuminated region, within a holographic reconstruction, may enable noise to be identified and mitigated where appropriate.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the intermediate holographic reconstruction is formed on a light receiving surface such as a diffuser surface or screen such as a diffuser.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A light detection and ranging, (LIDAR) system comprising:

a spatial light modulator (SLM) configured to display a diffractive pattern comprising a hologram of a structured light pattern, wherein the structured light pattern comprises an array of light spots;

a light source configured to illuminate the diffractive pattern in order to form a holographic reconstruction of the structured light pattern, wherein the structured light pattern is projected onto a scene;

a detection system comprising a plurality of light detection elements, each arranged to detect light from a respective individual field of view of the scene and to output a respective detected light signal, wherein a first subset of the individual fields of view are illuminated by a light spot of the structured light pattern and a second subset of the individual fields of view are not illuminated by a light spot of the structured light pattern; and a processor configured to identify noise in a first detected light signal, relating to an individual field of view of the first subset during a time window within which the structured light pattern is projected onto the scene, using a second detected light signal, relating to an individual field of view of the second subset during said time window.

2. The LIDAR system according to claim 1 wherein the processor is further configured to reduce the noise in the first detected light signal, or in a signal derived from the first detected light signal, as a result of the identification of the noise.

3. The LIDAR system according to claim 1, wherein the individual field of view of the first subset, to which the first detected light signal relates, has a predetermined spatial relationship with the individual field of view of the second subset, to which the second detected light signal relates.

4. The LIDAR system according to claim 1, wherein the processor is configured to use the second detected light signal to identify noise in the first detected light signal if there is a predetermined temporal relationship between a time at which a light detection element of the detection system outputs the first detected light signal and a time at which a light detection element of the detection system outputs the second detected light signal.

5. The LIDAR system according to claim 1, wherein the processor is configured to use the second detected light signal to identify noise in a first detected light signal if there is a match between the first detected light signal and the second detected light signal, at least to within a predetermined degree of tolerance, with respect to any of:

signal intensity; signal duration; signal shape; or signal pattern.

6. The LIDAR system according to claim 1, wherein the SLM is configured to dynamically change its displayed diffractive pattern in order to change which individual fields of view are comprised within the first subset, and so are illuminated by a light spot of the structured light pattern, and which individual fields of view are comprised within the second subset, and so are not illuminated by a light spot of the structured light pattern.

7. The LIDAR system according to claim 6, wherein each displayed diffractive pattern further comprises a grating function, and dynamically changing the displayed diffractive pattern comprises changing the grating function, without changing the hologram, in order to translate the holographic reconstruction.

8. A method of light detection and ranging (LIDAR), the method comprising:

displaying a diffractive pattern comprising a hologram of a structured light pattern, wherein the structured light pattern comprises an array of light spots;

illuminating the diffractive pattern in order to form a holographic reconstruction of the structured light pattern, and to project the structured light pattern onto a scene;

detecting light from each individual field of view of a plurality of individual fields of view of the scene in order to form a respective plurality of detected light signals, wherein a first subset of the fields of view are illuminated by a light spot of the structured light pattern and a second subset of the fields of view are not illuminated by a light spot of the structured light pattern; and identifying noise in a first detected light signal, relating to an individual field of view of the first subset during a time window within which the structured light pattern is projected onto the scene, using a second detected light signal, relating to an individual field of view of the second subset during said time window.

9. The method of claim 8 further comprising reducing the noise in the first detected light signal, or in a signal derived from the first detected light signal, as a result of said identification.

10. The method according to claim 8, wherein the individual field of view to which the first detected light signal relates has a correspondence to the individual field of view to which the second detected light signal relates.

11. The method according to claim 9, wherein the step of reducing the noise in the first detected light signal, or in a signal derived from the first detected light signal, comprises subtracting some or all of the second detected light signal from the first detected light signal.

12. The method according to claim 8, further comprising determining whether a predetermined correspondence exists, between the first detected light signal and the second detected light signal, and only using the second detected light signal to identify noise in the first detected light signal, if said predetermined correspondence exists.

13. The method according to claim 8, wherein the method is a computer-implemented method.

14. A non-transitory computer readable medium comprising instructions which, when executed by a data processing apparatus, causes the data processing apparatus to perform a method according to claim 8.

15. The LIDAR system according to claim 2, wherein the individual field of view of the first subset, to which the first detected light signal relates, has a predetermined spatial relationship with the individual field of view of the second subset, to which the second detected light signal relates.

16. The LIDAR system according to claim 2, wherein the processor is configured to use the second detected light signal to identify noise in the first detected light signal if there is a predetermined temporal relationship between a time at which a light detection element of the detection system outputs the first detected light signal and a time at which a light detection element of the detection system outputs the second detected light signal.

17. The LIDAR system according to claim 3, wherein the processor is configured to use the second detected light signal to identify noise in the first detected light signal if there is a predetermined temporal relationship between a time at which a light detection element of the detection system outputs the first detected light signal and a time at which a light detection element of the detection system outputs the second detected light signal.

18. The method according to claim 9 wherein the individual field of view to which the first detected light signal relates has a correspondence to the individual field of view to which the second detected light signal relates.

19. The method according to claim 10, wherein reducing the noise in the first detected light signal, or in a signal derived from the first detected light signal, comprises subtracting some or all of the second detected light signal from the first detected light signal.

* * * * *